United States Patent Office 3,826,665
Patented July 30, 1974

3,826,665
SETTING AND HARDENING OF ALUMINOUS CEMENT
Christian Hovasse, Decines, and Pierre Allemand, Lyon, France, assignors to Rhone-Progil, Decines, France
No Drawing. Filed Mar. 6, 1973, Ser. No. 338,427
Claims priority, application France, Mar. 9, 1972, 7208902
Int. Cl. C04b 7/32
U.S. Cl. 106—104                                8 Claims

ABSTRACT OF THE DISCLOSURE

The inclusion of a composition comprised of (1) lithia or a water-soluble lithium salt and (2) a hydroxylated organic acid, or a salt or ester thereof, accelerates the setting and hardening times of aluminous cement and provides mortars, concretes, grouts, etc., derived from such modified high alumina type cements wherein the superior mechanical and handling properties generally characteristic of aluminous cements are not appreciably affected.

BACKGROUND OF THE INVENTION

The present invention relates to a new composition which, when incorporated into aluminous cement, accelerates the setting and hardening of same and to improved mortars and concretes derived from aluminous cement modified with the aforementioned adjuvant composition.

Aluminous cement has as its major constituent monocalcium aluminate and is typically a slow setting cement. In spite of its slow setting time, aluminous cement is widely used in the building and construction industries inasmuch as mortars and concretes containing this cement as a binder possess the requisite fluidity during mixing. Moreover, once hardened, the final products evidence a high level of mechanical performance over extended periods of time. Also, aluminous cement is resistant to bases and attains its maximum strength more rapidly than Portland cement and, unlike Portland cement, is capable of withstanding solutions of sulfates.

In order to maximize the advantageous characteristics of an aluminous cement, as described above, and to make it available for those applications where it is necessary to use cements which rapidly set and harden, it is often necessary to reduce the time required for setting and hardening of the aluminous cement by adding an adjuvant thereto.

A number of compounds have heretofore been proposed as additives to accelerate setting and hardening of cements. For example, German Pat. No. 648,851 and French Pat. No. 1,574,213 disclose lithia or water-soluble lithium salts for this purpose; however, mortars and concretes which are modified in accordance with these prior patents by adding the indicated lithium compounds become rigid almost immediately upon mixing and, hence, lack sufficient fluidity for most practical applications of the resultant compositions. Moreover, such prior art compositions evidence a tendency to crack in a relatively short time.

Thus, a need exists for a composition and a process for improving the setting and hardening of aluminous-type cements without adversely affecting the handling characteristics and the mechanical performance of mortars, concretes and analogous products derived from such cements.

SUMMARY OF THE INVENTION

It is, therefore, a primary object of this invention to provide for incorporation into cements having a high content of mono-calcium aluminate an adjuvant which avoids the disadvantages of prior art additive agents for such cements as well as for concretes, mortars and the like derived from same.

Another object of the present invention is to provide a process for improving the setting and hardening of aluminous cements comprising adding a two-component adjuvant composition to the cement to yield cement-containing products having accelerated setting and hardening characteristics while at the same time retaining desired fluidity and other similar handling properties as well as acceptable mechanical performance.

Other objects, features and advantages of this invention will become more apparent to those skilled in the art from the detailed description of the invention which follows.

DETAILED DESCRIPTION OF THE INVENTION

In accordance with the present invention, it has been found that a composition resulting from the association of lithia or water-soluble lithium salts with a hydroxylated organic acid or a salt or ester thereof, in weight ratios with regard to the cement of from about 0.005 to 1% for lithia or water-soluble lithium salts with a hydroxylated the hydroxy acid, preferably between about 0.01 and 0.05% for each of the two components, is an extremely valuable adjuvant composition for improving the setting and hardening of aluminous cement and mortars and concretes prepared from such a cement. Thus, the ratio of the two components is between 1000:1 and 1:200 and in the preferred embodiment, the adjuvant is a combination of the lithium compound and hydroxy acid compound in the ratio of from 1:5 to 5:1. In practicing the present invention, the binary composition comprised of lithia or a lithium salt together with a hydroxylated organic acid or a derivative thereof, can be incorporated directly into the aluminous cement or into mortars and concretes during their manufacture or, alternatively, may be added to the mixing water.

In general, practically any water-soluble mineral or organic salt of lithium is suitable for use as the first component of the binary adjuvant compositions of the present invention. Exemplary of common lithium salts which may be utilized in this context are lithium chloride, lithium bromide, lithium iodide, lithium sulfate, lithium nitrate, lithium dichromate, lithium perchlorate, lithium formate, lithium acetate, lithium benzoate, lithium oxylate, etc.

The preferred hydroxylated organic acids suitable for use as the second component of the adjuvant composition include tartaric, citric, gluconate, malic, lactic and salicylic acids. Moreover, salts of the foregoing, preferably alkali metal salts, and esters thereof in which the acidic or alcoholic functions are partially or wholly esterified may be used. Preferably, the acid and alcohol groups are esterified through lower alkyl compounds and lower fatty acids respectively.

In order to further illustrate the present invention and the advantages thereof, the following specific examples are given, it being understood that same are intended merely as illustrative and in no wise limitative.

Example 1

In this example, a mortar composition was prepared according to the French standard NF.P 15.403 ("Catalogue des normes francais") utilizing the following components:

|  | Grams |
|---|---|
| Normal sand (French standard NF.P 15.403) | 1350 |
| Aluminous cement | 450 |

The mortar was prepared according to the method described in the foregoing French standard with the exception that the ratio by weight of water to cement was decreased from 0.5 set forth in the standard to 0.45 inasmuch as it was found that the quantity of water must be decreased by about 10% in order to obtain a mortar which was not excessively fluid.

Examples 2–24

The mortar prepared in Example 1 was utilized as a reference blank for purposes of comparison and for preparing mortars containing the binary composition of this invention. The quantities of lithia or lithium salt and hydroxylated organic acid, salt or ester thereof and the results of the comparative tests are set forth in tabular form in Table 1 below.

hours to 833 bars after 24 hours, 938 bars after 7 days and 965 bars after 28 days.

For a mortar containing .02% lithia and .02% sodium gluconate, the compression strength values are 84 bars after 3 hours, 288 bars after 5 hours, 625 bars after 24 hours, 669 bars after 7 days and 730 bars after 28 days.

With respect to a mortar containing .005% lithium chloride and .005% mixed sodium and potassium tartrate, the compression strength changes from 92 bars after 5 hours, 646 bars after 24 hours, 824 bars after 7 days and 950 bars after 28 days.

TABLE 1

Mortar realized with a constant ratio of water to cement equal to 0.45.

| Example number | Lithium compounds, percent by weight with regard to the cement | Organic hydroxylic acids or derivatives thereof, percent by weight with regard to the cement | Spreading | Initial setting | Final setting |
|---|---|---|---|---|---|
| 1 | Reference blank | Reference blank | 6 | 3 hrs. 50 min | 4 hrs. 10 min. |
| 2 | Lithia, 0.01 | None | 2.4 | 1 hr. 25 min | 1 hr. 30 min. |
| 3 | Lithia, 0.03 | | No spreading | 30 min | 35 min. |
| 4 | Lithium chloride, 0.005 | Na and K tartrate, 0.005 | 6 | 3 hrs. 10 min | 3 hrs. 20 min. |
| 5 | Lithium formate, 0.005 | Citric acid, 0.001 | 6.2 | 3 hrs | 3 hrs. 20 min. |
| 6 | Lithium chloride, 0.02 | Ethyl lactate, 0.02 | 6 | 1 hr. 05 min | 1 hr. 25 min. |
| 7 | Lithium chloride, 0.1 | Ethyl lactate, 0.1 | 6.5 | 30 min | 45 min. |
| 8 | Lithium chloride, 0.3 | Ethyl lactate, 0.3 | 7.2 | 40 min | 55 min. |
| 9 | Lithium chloride, 1 | Ethyl lactate, 1 | 8.2 | 55 min | 1 hr. 05 min. |
| 10 | Lithia, 0.005 | Na gluconate, 0.001 | 6.2 | 3 hrs. 30 min | 3 hrs. 50 min. |
| 11 | Lithia, 0.02 | Na gluconate, 0.02 | 6.4 | 40 min | 1 hr. 30 min. |
| 12 | Lithia, 0.1 | Na gluconate, 0.1 | 6.7 | 1 hr. 50 min | 2 hrs. |
| 13 | Lithia, 0.5 | Na gluconate, 0.5 | 6.1 | 2 hrs | 2 hrs. 10 min. |
| 14 | Lithia, 1 | Na gluconate, 1 | 7.3 | 5 min | 45 min. |
| 15 | Lithia, 0.2 | Gluconic acid, 0.02 | 5.7 | 1 hr. 20 min | 1 hr. 30 min. |
| 16 | Lithia, 0.02 | Na and K tartrate, 0.02 | 6.2 | 20 min | 30 min. |
| 17 | Lithia, 0.02 | Tartaric acid, 0.02 | 6.9 | 40 min | 55 min. |
| 18 | Lithia, 0.02 | Lactic acid, 0.02 | 6.5 | 15 min | 25 min. |
| 19 | Lithia, 0.02 | Citric acid, 0.02 | 4.7 | 50 min | 1 hr. |
| 20 | Lithia, 0.02 | Salicylic acid, 0.02 | 5.4 | 15 min | 20 min. |
| 21 | Lithium nitrate, 0.05 | Na gluconate, 0.1 | 6.8 | 50 min | 1 hr. 05 min. |
| 22 | Lithium sulphate, 0.08 | Ethyl tartrate, 0.15 | 5.5 | 1 hr. 10 min | 1 hr. 30 min. |
| 23 | Lithium benzoate, 0.08 | Gluconic acid, 0.08 | 6.4 | 5 min | 1 hr. 10 min. |
| 24 | Lithium acetate, 0.2 | Salicylic acid, 0.002 | 5.7 | 50 min | 1 hr. 15 min. |

In Table 1, "spreading" characterizes the fluidity of the mortar and is expressed as the ratio of the spreading coefficients of the mortar containing the composition of the invention and that of the blank mortar (reference blank of Example 1). The spreading coefficient was measured using a trunconic volume of mortar which was subjected to compression by means of 15 successive shakings (flow test method), and it is expressed as the difference in centimeters between the diameter of the "spread" mortar and the diameter of the base of the frustum of the cone which is 8 cm. A reference mortar without any additives generally has a spreading of between 5.5 and 6.5 cms.

Mortar setting time was measured by means of a Vicat needle according to the French standard NF.P 15.431.

It is apparent from a comparison of the results shown in Table 1 that, compared to the reference blank (Example 1), the addition of lithium compounds alone significantly reduces the setting time but also causes the mortar to become rigid, and when the lithium content reaches .03% with respect to the cement, the mortar no longer spreads (Examples 2 and 3).

Contrariwise, the simultaneous utilization of lithia or a lithium salt and an organic hydroxy acid or a derivative thereof in accordance with the present invention significantly accelerates the setting time without seriously altering the fluidity or handling characteristics of the mortar.

Further evidence of the advantages of the composition according to the present invention is provided by comparing the mechanical performance of the reference mortar with that of mortars containing the present composition. Mechanical performance was determined by measuring the compression strength of the mortars on prismatic test tubes (4 x 4 x 16 cm.) according to the French standard NF.P 15.401. The compression strength of the reference mortar changes from 25 bars after 5

From the foregoing, it is evident that the addition of the composition of the present invention to mortar containing aluminous cement increases the mechanical performance of the mortar during the initial period following application, and also that although the long-term performance is slightly decreased in comparison to the reference mortar, the long-term mechanical performance of mortars containing the composition of the present invention compare very favorably with the performance of mortars without additives.

The utility of the compositions of the present invention in preparing fluid grouts is illustrated by the following examples.

Example 25

A fluid grout composition was prepared utilizing the following components and amounts:

|  | Grams |
|---|---|
| Fontainebleau sand | 400 |
| Aluminous cement | 1600 |

In preparing the grout, the ratio of water to cement was maintained at 0.28 in order to obtain a grout having a viscosity suitable for injection.

Examples 26–29

The reference grout prepared in Example 25 was utilized to prepare grouts additionally containing the adjuvant compositions of the present invention. The ratio of water to cement was the same as in Example 25 with the exception that where lithia alone was utilized (Example 26) the ratio of water to cement was increased to 0.35 in order to obtain a grout having a viscosity suitable for injection.

The particular additive components and their quantities, as well as the comparative test results, are set forth in Table 2 hereinafter.

TABLE 2
Fluid grout for injection

| Example number | Lithium compound, percent | Organic hydroxylic acid, or derivative thereof, percent | Injection time | Initial setting | Final setting | Compression time | Strength bars |
|---|---|---|---|---|---|---|---|
| 25 | Reference grout without additive. | Reference grout without additive. | 4 hrs | 4 hrs. 50 min | 5 hrs | 2 hrs | nul |
| | | | | | | 5 hrs | nul |
| | | | | | | 8 hrs | 375 |
| | | | | | | 24 hrs | 622 |
| | | | | | | 7 days | 781 |
| | | | | | | 28 days | 945 |
| 26 | Lithia, 0.02 | None | 5 min | 25 min | 1 hr. 30 min | 2 hrs. 30 min | 50 |
| | | | | | | 5 hrs | 306 |
| | | | | | | 8 hrs | 390 |
| | | | | | | 24 hrs | 500 |
| | | | | | | 7 days | 710 |
| | | | | | | 28 days | 713 |
| 27 | Lithia, 0.02 | Sodium gluconate, 0.02 | 25 min | 40 min | 1 hr | 2 hrs | 18 |
| | | | | | | 5 hrs | 403 |
| | | | | | | 8 hrs | 545 |
| | | | | | | 24 hrs | 646 |
| | | | | | | 7 days | 824 |
| | | | | | | 28 days | 955 |
| 28 | Lithium formate, 0.03 | Na and K tartrate, 0.02 | 20 min | 30 min | 45 min | 2 hrs | 35 |
| | | | | | | 8 hrs | 580 |
| | | | | | | 24 hrs | 620 |
| | | | | | | 7 days | 805 |
| | | | | | | 28 days | 910 |
| 29 | Lithium chloride, 0.01 | Citric acid, 0.005 | 45 min | 1 hr. 30 min | 2 hrs | 3 hrs | 25 |
| | | | | | | 8 hrs | 560 |
| | | | | | | 24 hrs | 670 |
| | | | | | | 7 days | 830 |
| | | | | | | 28 days | 950 |

Referring to Example 26 wherein lithia alone was utilized to promote rapid setting of the grout, it is apparent that in spite of the increased quantity of water utilized in proportion to the cement the injection time was reduced to 5 minutes as a consequence of the fact that lithia causes the viscosity of the grout to increase extremely rapidly until a thixotropic form of grout is obtained which cannot satisfactorily be injected. However, the combination of a lithium compound with the organic acid or derivative thereof in accordance with the present invention significantly delays the onset of thixotropy, and as a result, the injection time for grouts containing the compositions of this invention is generally about ½ hour which is ample time for injection. It is evident from the results set forth in Table 2 that the grouts prepared according to the present invention attain minimum compression strengths more rapidly than grouts without any additives and further that the long-term mechanical performance of grouts containing the present adjuvant compositions closely parallels the performance of grouts containing no additives.

While certain preferred ranges have been set forth previously with respect to the quantities of lithia or lithium salts and hydroxylated organic acids, or derivatives thereof, it will be appreciated by those of ordinary skill in the art that the specific quantities utilized will vary according to the setting and hardening characteristics desired as well as the ultimate intended use of the product. In general, however, it has been found that a composition comprised by weight with regard to cement of from about 0.005 to 1% lithia or a lithium salt and from about 0.001 to 1% of an organic hydroxy acid or derivative thereof may be utilized in the preparation of rapid setting mortars, as well as conventional concretes including reinforced concrete, concrete for roads and pre-manufactured concrete.

The composition of the present invention is likewise valuable in the preparation of fluid grouts utilized in sealing operations which require the attainment of maximum mechanical performance in a relatively short period of time. These grouts may, therefore, be used in the consolidation and tightening of soils by injection wherein it is necessary to prevent the grout from advancing too far from the injection point in the subterranean strata or from dilution by underground water.

While the invention has been described and pointed out with reference to certain preferred embodiments thereof, those skilled in the art will appreciate that various changes, modifications or substitutions can be made without departing from the spirit of the invention. It is intended, therefore, that the invention be limited only by the scope of the claims which follow.

What is claimed is:

1. An adjuvant composition for improving the setting and hardening properties of aluminous cement and mortar, concrete and grout compositions containing said cement, comprising a lithium compound selected from the group consisting of lithia, and water-soluble salts of lithium, and an acid component selected from the group consisting of hydroxy organic acids, alkali metal salts thereof and esters thereof, said lithium compound and said acid component being present in a weight ratio of from about 1000:1 to 1:200.

2. The adjuvant composition as defined by Claim 1, wherein said lithium compound and said acid component are present in a weight ratio of from about 5:1 to 1:5.

3. The adjuvant composition as defined by Claim 1, wherein said water-soluble lithium salts are mineral and organic salts selected from the group consisting of chloride, bromide, iodide, bichromate, perchlorate, sulfate, nitrate, formate, acetate, benzoate and oxalate salt of lithium.

4. The composition as defined by Claim 1, wherein said organic hydroxy acid is selected from the group consisting of tartaric, citric, gluconic, malic, lactic and salicylic acid.

5. The composition as defined by Claim 1, wherein said organic hydroxy acid is at least partially esterified through the acidic or alcoholic functions of said acid.

6. A hardenable composition of matter comprising an aluminous cement and the adjuvant composition as defined by Claim 1, said adjuvant composition being present in an amount providing from about 0.005 to 1% by weight of the lithium compound and from about 0.001 to 1% by weight of the acid component, based upon the aluminous cement.

7. The hardenable composition as defined by Claim 6, wherein said adjuvant composition is present in an amount providing from about 0.01 to 0.05% by weight of each of said lithium compound and said acid component, based upon the aluminous cement.

8. A process for improving the setting and hardening properties of aluminous cement-containing compositions, which comprises incorporating thereinto the adjuvant composition defined by Claim 1 in an amount providing from about 0.005% to 1% by weight of said lithium compound and from about 0.001% to 1% by weight of said acid component, based on the aluminous cement.

References Cited

UNITED STATES PATENTS

| | | | |
|---|---|---|---|
| 3,656,985 | 4/1972 | Bonnel et al. | 106—90 |
| 3,600,203 | 8/1971 | Aldera | 106—38.3 |
| 3,373,048 | 6/1964 | Angstadt et al. | 106—90 |

DELBERT E. GANTZ, Primary Examiner

J. P. SHEEHAN, Assistant Examiner

U.S. Cl. X.R.

106—315